United States Patent [19]

Hirai et al.

[11] Patent Number: 5,424,008
[45] Date of Patent: Jun. 13, 1995

[54] COATING SOLUTIONS FOR FORMING TRANSPARENT CONDUCTIVE CERAMIC COATINGS, SUBSTRATES COATED WITH TRANSPARENT CONDUCTIVE CERAMIC COATINGS AND PROCESS FOR PREPARING SAME, AND USES OF SUBSTRATES COATED WITH TRANSPARENT CONDUCTIVE CERAMIC COATINGS

[75] Inventors: Toshiharu Hirai, Munakata; Yoneji Abe, Kitakyushu; Michio Komatsu, Tokyo, all of Japan

[73] Assignee: Catalysts & Chemical Industries Co., Ltd., Japan

[21] Appl. No.: 310,170

[22] Filed: Sep. 21, 1994

Related U.S. Application Data

[62] Division of Ser. No. 474,117, Apr. 24, 1990, Pat. No. 5,382,383.

[30] Foreign Application Priority Data

Aug. 24, 1988 [JP] Japan .................. 63-210362

[51] Int. Cl.⁶ .................. H01B 1/20; H01B 1/22; B32B 17/00
[52] U.S. Cl. .................. 252/501.1; 252/500; 252/518; 252/519; 252/520; 252/521; 428/411.1; 428/426; 428/428; 428/432; 428/446; 428/448; 428/450; 428/470; 428/472; 428/689; 428/699; 428/702

[58] Field of Search .................. 428/426, 432, 411.1, 428/446, 470, 689, 702, 448, 450, 472, 699, 428; 252/500, 518, 519, 520, 521, 501.1

[56] References Cited

U.S. PATENT DOCUMENTS

| | | | |
|---|---|---|---|
| 4,568,578 | 2/1986 | Arfsten et al. | 428/432 |
| 4,859,499 | 8/1989 | Sauvinet et al. | 427/126.3 |
| 4,869,948 | 9/1989 | Iida et al. | 428/447 |
| 5,013,607 | 5/1991 | Sato et al. | 428/426 |

FOREIGN PATENT DOCUMENTS

| | | |
|---|---|---|
| 0195493 | 9/1986 | European Pat. Off. . |
| 56-165202 | 12/1981 | Japan . |
| 63-152675 | 12/1986 | Japan . |
| 8606658 | 5/1985 | WIPO .................. 427/126.3 |

OTHER PUBLICATIONS

Patent Abstract of Japan Publication No. 62-280286 (A), vol. 12, No. 172 (C-497) (3019) May 21, 1988.

*Primary Examiner*—Anthony Green
*Attorney, Agent, or Firm*—Webb Ziesenheim Bruening Logsdon Orkin & Hanson

[57] ABSTRACT

In accordance with the present invention, there are provided coating solutions for forming transparent conductive ceramic coatings, said coating solutions being homogeneous solutions or dispersions of acetylacetonate chelate compound, conductive substances and, if necessary, silicon compound and/or alkoxides of metals other than silicon in mixtures of water and organic solvents, and substrates having thereon transparent conductive ceramic coatings formed from said coating solutions and uses thereof.

12 Claims, 2 Drawing Sheets

COATING SOLUTIONS FOR FORMING TRANSPARENT CONDUCTIVE CERAMIC COATINGS, SUBSTRATES COATED WITH TRANSPARENT CONDUCTIVE CERAMIC COATINGS AND PROCESS FOR PREPARING SAME, AND USES OF SUBSTRATES COATED WITH TRANSPARENT CONDUCTIVE CERAMIC COATINGS

This is a divisional of application Ser. No. 07/474,117 filed on Apr. 24, 1990 U.S. Pat. No. 5,382,383.

FIELD OF THE INVENTION

This invention relates to coating solutions (coating liquids) for forming transparent conductive ceramic coatings and process for preparing the same. The invention also relates to substrates coated with transparent conductive ceramic coatings, process for preparing the same and uses thereof. More particularly, the invention relates to coating solutions capable of forming continuously at low temperatures such as about 120° C. conductive ceramic coatings which are extremely transparent, excellent in adhesion to the surface of substrates such as glass, plastic and the like materials, high in durability such as alkali resistance, acid resistance and resistance to saline solutions, and in resistance to scuffing.

The invention further relates to substrates coated with transparent conductive ceramic coatings formed by using the above-mentioned coating solutions for forming transparent conductive ceramic coatings, and to processes for preparing the same. Furthermore, the invention relates displaying devices equipped with the above-mentioned substrates coated with transparent conductive ceramic coatings as face-plates and copy machines equipped with the above-mentioned substrates coated with transparent conductive ceramic coatings as platen glass.

BACKGROUND OF THE INVENTION

Glass or plastic substrates are transparent and have a wide variety of uses. However, these substrates are liable to generate static electricity on their surface, because they are insulators. When glass or plastic substrates are used, as they are, as face-plates for displaying devices such as cathode ray tube (CRT), fluorescent indication pipe (FIP), plasma display (PDP), liquid crystal display (LCD), etc., rubbish or dust attaches to the surface of face-plates and the images displayed are difficult to look at. In the case of LCD, moreover, there is sometimes brought about destruction of IC or mistake in display by static electricity generated. In a copy machine 1 equipped with an automatic document feeder (ADF) 2 as shown in FIG. 1, paper clogging is sometimes caused by static electricity generated on a platen glass 3 in the course of feeding documents, whereby continuous feeding of the documents can be made no longer. In the case of plastic substrates, moreover, because of their low surface hardness, the plastic substrates readily receive scuff marks, whereby they sometimes decrease in transparency.

With the view of solving such problems as mentioned above, there are proposed processes for forming on substrates metallic coatings or conductive inorganic oxide coatings by the vapor phase method such as CVD, PVD or sputtering. The coatings obtained by these processes, however, are low in acid resistance as well as in alkali resistance, and liable to scuffing as they are low in resistance to scuffing, though they are excellent in transparency or conductivity. In forming these substrates, it is necessary to use vacuum metallizers and, moreover, there is a limit to an area or shape of the substrate on which the coating can be formed by the vacuum metallizers. Furthermore, in these processes no coatings are formed at low temperatures, and continuous productivity is poor because said processes are carried out batchwise.

In the platen glass coated with such an antistatic coating as mentioned above, the coating formed on the platen glass was sometimes scraped off by the documents fed to ADF or a rubber belt fitted to ADF. When copying is carried out in higher copy sensitivity, that is, at a gray scale, by using a copy machine with such a platen glass as mentioned above, there was brought about such a new problem that the scraped portion are printed as stains on the copy.

There is also proposed a process for imparting conductivity to substrates by coating the substrates with conductive paints prepared by dispersing conductive substances in resin. The coatings obtained by this process, however, had such problems that they are poor in transparency, durability and resistance to scuffing, though they are excellent in conductivity.

The face-plates of displaying devices, on one hand, are required sometimes to have a regular reflection reducing effect (hereinafter called anti-glare) for inhibiting glaring of the face-plates, in addition to the antistatic effect thereof. The following are known as procedures intending to impart anti-glare and antistatic effect to the face-plate of displaying devices. That is, Japanese Patent L-O-P Publn. No. 16452/1986 discloses a process which comprises preheating a face-plate composed of glass or plastics, spraying over said face-plate a colloidal solution of a silicon compound such as a partially hydrolyzed silicic ester or the like, a silicon compound such as silicon tetrachloride or the like, or a solution obtained by mixing said colloidal solution with a water-soluble compound of inorganic metal such as platinum, gold, palladium or tin, and forming a finely uneven coating composed of silicon oxide or its hydrate on the surface of the face-plate, followed by drying and heating.

Further, Japanese Utility Model L-O-P Publn. No. 168951/1984 discloses a process which comprises forming a coating layer on the face-plate by the vacuum deposition or dip method from a mixture of tin oxide or indium oxide and silicon oxide or from a laminate thereof.

In the face-plates obtained by these processes mentioned above, however, anti-glare is insufficient or the antistatic effect thereof varies depending upon the ambient temperature or humidity. Under certain circumstances, moreover, resolving power of the displaying devices equipped with such face-plates sometimes decreased. Furthermore, the coatings formed on the face-plates are poor in adhesion to the face-plates and easily peel off, liable to scuffing because of their low resistance to scuffing, and peel off or flow because of their low durability, whereby anti-glare and the antistatic effect could not be maintained for a long period of time.

By way of Japanese Patent Appln. No. 299686/1986, the present applicant applied for a patent a coating solution for forming a conductive coating, said coating solution being a homogeneous dispersion comprising water and an organic solvent of zirconium oxysalt, silicon alkoxide or its derivative and a conductive substance. The conductive coating obtained by heating a wet coating formed by using the above-mentioned coating solution at a temperature of at least 250° C. is excellent in performance characteristics such as transparency, conductivity and resistance to scuffing. However, the conductive coating obtained likewise but by heating at a temperature below 250° C. is poor in durability, and it was difficult to apply said conductive coating to a plastic substrate. Furthermore, because this coating solution is not always sufficiently stable, the coating solution applied to the substrate came to gel in some cases during the coating operation, particularly a continuous operation by transfer printing, whereby the continuous operation intended met with difficulties. In addition thereto, the coating solution had to be kept at below 15° C. in order to preserve it for an extended period of time.

The present invention is intended to solve such problems associated with the prior art as mentioned above. That is, firstly, an object of the invention is to provide a coating solution (hereinafter called coating solution I) for forming transparent conductive ceramic coatings, said coating solution being a homogeneous solution or dispersion of an acetylacetonate chelate compound and a conductive substance in a mixture of water and an organic solvent.

Secondly, an object of the invention is to provide a coating solution (hereinafter called coating solution II) for forming transparent conductive ceramic coatings, said coating solution being a homogeneous solution or dispersion of an acetylacetonate chelate compound (excluding dialkoxy-bisacetyiacetonatozirconium), a silicon compound and a conductive substance in a mixture of water and an organic solvent.

Thirdly, an object of the invention is to provide a coating solution (hereinafter called coating solution III) for forming transparent conductive ceramic coatings, said coating solution being a homogeneous solution or dispersion of an acetylacetonate chelate compound, alkoxide of metal other than silicon, and a conductive substance in a mixture of water and an organic solvent.

Fourthly, an object of the invention is to provide a coating solution (hereinafter called coating solution IV) for forming transparent conductive ceramic coatings, said coating solution being a homogeneous solution or dispersion of an acetylacetonate chelate compound, a silicon compound, alkoxide of metal other than silicon and a conductive substance in a mixture of water and an organic solvent.

Fifthly, an object of the invention is to provide a substrate (hereinafter called substrate A), such as composed of glass, plastics or the like, on which transparent conductive ceramic coatings being formed by using the coating solution I, II, III or IV, said conductive ceramic coatings being excellent in durability, transparency, resistance to scuffing, adhesion and antistatic effect, and sixthly an object of the invention is to provide a substrate (hereinafter called substrate B) on which transparent conductive ceramic coatings having antiglare in addition to those performance characteristics as mentioned above, and further to provide processes for preparing such substrates as mentioned above.

Seventhly, an object of the invention is to provide a displaying device (hereinafter called displaying device A) comprising the substrate A as a face-plate.

Eighthly, an object of the invention is to provide a displaying device (hereinafter called displaying device B) comprising the substrate B as a face-plate.

Ninthly, an object of the invention is to provide a copy machine comprising the substrate A as a platen glass.

DISCLOSURE OF THE INVENTION

The coating solution I of the present invention is characterized by comprising a homogeneous solution or dispersion of an acetylacetonate chelate compound and a conductive substance in a mixture of water and an organic solvent.

The coating solution II of the present invention is characterized by comprising a homogeneous solution or dispersion of an acetylacetonate chelate compound (excluding dialkoxy-bisacetonato zirconium), a silicon compound and a conductive substance in a mixture of water and an organic solvent.

The coating solution III of the present invention is characterized by comprising a homogeneous solution or dispersion of an acetylacetonate chelate compound, alkoxide of metal other than silicon, and a conductive substance in a mixture of water and an organic solvent.

The coating solution IV of the present invention is characterized by comprising a homogeneous solution or dispersion of an acetylacetonate chelate compound, a silicon compound, alkoxide of metal other than silicon, and a conductive substance in a mixture of water and an organic solvent.

The substrate A of the present invention is characterized by comprising a substrate and thereon a transparent conductive ceramic coating formed by using the above-mentioned coating solution I, II, III or IV, and having a surface resistance of $10^3$–$10^{11}$ $\Omega/\Box$, a total light transmittance of at least 85% and a haze of less than 10%.

The substrate B of the present invention is characterized by comprising a substrate and thereon a transparent conductive ceramic coating formed by using the above-mentioned coating solution I, II, III or IV, and having a surface resistance of $10^3$–$10^{11}$ $\Omega/\Box$ and a glossiness of 30–100%.

The displaying device A of the present invention is characterized by comprising as a face-plate the substrate A comprising a substrate and thereon a transparent conductive ceramic coating formed by using the above-mentioned coating solution I, II, III or IV, said substrate A having a surface resistance of $10^3$–$10^{11}$ $\Omega/\Box$ total light transmittance of at least 85%, a haze of less than 10% and a resolving power of at least 50 bars/cm.

The displaying device B of the present invention is characterized by comprising as a face-plate the substrate B comprising a substrate and thereon a transparent conductive ceramic coating formed by using the above-mentioned coating solution, I, II, III or IV, said substrate B having a surface resistance of $10^3$–$10^{11}$ $\Omega/\Box$, a glossiness of 30–100% and a resolving power of at least 50 bars/cm.

The copy machine of the present invention is characterized by having as a platen glass the substrate A comprising a substrate and thereon a transparent conductive ceramic coating formed by using the above-mentioned coating solution I, II, III or IV, said substrate A having a surface resistance of $10^3$–$10^{11}$ $\Omega/\Box$, a total light transmittance of at least 85% and a haze of less than 10%.

The first process preferred in the present invention for preparing a substrate with a transparent conductive ceramic coating of the invention is characterized by coating the substrate preheated to 40°–90° C. with the above-mentioned coating solution I, II, III or IV, followed by drying and/or heating.

The second process paticularly preferred in the present invention for preparing a substrate with a transparent conductive ceramic coating of the invention is characterized by coating the substrate with the above-mentioned coating solution I, II, III or IV, and irradiating the coating as formed with an electromagnetic wave having a wavelength shorter than that of visible light after and/or during at least one of the steps of applying the coating solution, on the substrate, drying the coating as formed on the substrate and heating the dried coating.

The third process particularly preferred in the present invention for preparing a substrate with a transparent conductive ceramic coating of the invention is characterized by (1) coating the substrate with a transparent conductive ceramic coating as obtained above on the surface thereof with a coating solution for forming a transparent protective coating, followed by drying and/or heating, or (2) keeping the substrate with a transparent conductive ceramic coating as obtained above at 40°–90° C. by preheating, and coating the preheated substrate on the surface thereof with a coating solution for forming a transparent protective coating, followed by drying and/or heating.

The fourth process particularly preferred in the present invention for preparing a substrate with a transparent conductive ceramic coating of the invention is characterized by repeating the above-mentioned third process of the invention except that the transparent protective coating formed on the substrate is irradiated with an electromagnetic wave having a wavelength shorter than that of visible light after and/or during at least one of the steps of applying the coating solution for forming a transparent protective coating on the substrate, drying the transparent protective coating as formed on the substrate and heating the dried transparent protective coating.

Figure 1:
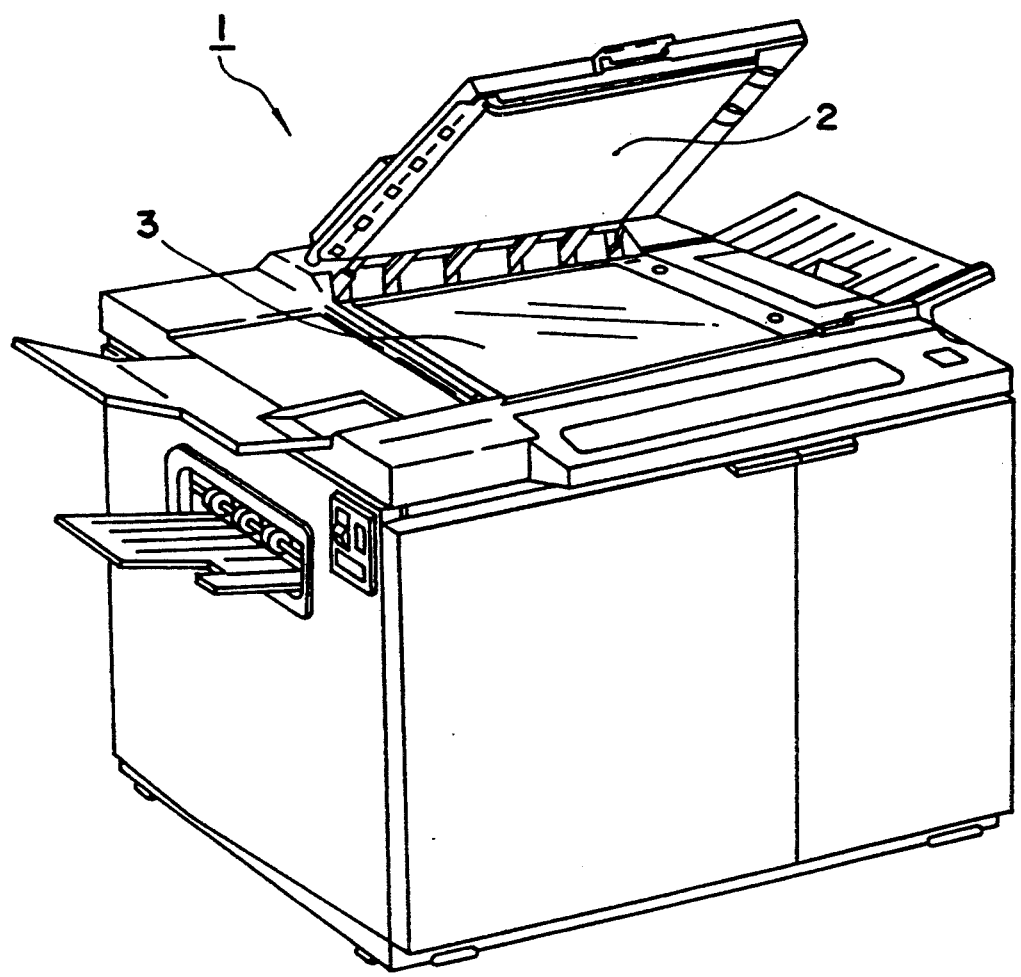
FIG. 1 is an oblique view of a copy machine equipped with an automatic document feeder.

1 ... Copy machine
2 ... Automatic feeder
3 ... Platen glass
4 ... Bar chart

BEST MODE FOR PRACTICING THE INVENTION

Hereinafter, the coating solution I of the present invention is first illustrated in detail.

The coating solution I of the present invention is formed by homogeneously dissolving or dispersing an acetylacetonate chelate compound and a conductive substance in a mixture of water and an organic solvent. The components of this coating solution are illustrated below.

As used herein, the term acetylacetonate chelate compound is intended to include chelate compounds having acetylacetone molecule as a ligand, and the chelate compounds are those represented by the following formula (I) or condensates thereof. In the present invention, there may be used one or a combination of two or more selected from among the chelate compounds or condensates thereof as mentioned above. In the coating solution I, it is presumed that the acetylacetonate chelate compound plays a role in improvement of dispersibility of the conductive substance and thermal stability of the coating solution, and functions as a protective colloid for the conductive substance.

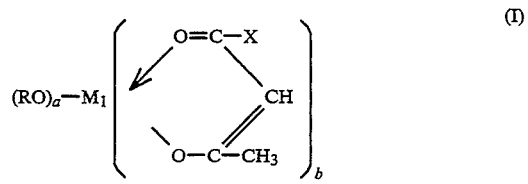

wherein a+b is equal to 2–4, a is 0–3, b is 1–4, R is $-C_nH_{2n+1}$ (n=3 or 4), X is $CH_3-$, $CH_3O-$, $C_2H_5-$ or $C_2H_5O-$, and $M_1$ is an element selected from among those belonging to Groups IB, IIA, B, IIIA, B, IVA, B, VA, B, VIA, VIIA and VIII in the periodic table or vanadyl (VO). In the above formula (I), preferred combinations of these elements or VO with a and b are as shown in the following table.

| a | 0–1 | 0–2 | 0–3 |
|---|---|---|---|
| b | 1–2 | 1–3 | 1–4 |
| a + b | 2 | 3 | 4 |
| $M_1$ | Co, Cu, Mg, Mn, Pb, Ni, Zn, Sn, Ba, Be, Vo | Al, Cr, Fe, V, Co, In, Ta, Y, B | Ti, Zr, Hf, Sb |

The conductive substance used in the present invention includes those hitherto known as conductive substances such as tin oxide, tin oxide doped with antimony, fluorine or phosphorus, indium oxide, or indium oxide doped with tin or fluorine.

These conductive substances are desirably in the form of finely divided particle having an average particle diameter of less than 0.4 μm. For applications in face-plates of displaying devices such as CRT, FIP, PDP and LCD or in platen glass of copy machine where high transparent with low haze is required, it is preferable to use the conductive substances having an average particle diameter of 0.01–0.1 μm. In this case, however, it is desirable that at least 60% of the total particle of the conductive substance used is occupied by particles having a particle diameter of less than 0.1 μm, because the resulting transparent conductive ceramic coating comes to decrease in transparency if the conductive substance used contains increased amounts of particles having a particle diameter exceeding 0.1 μm even when said conductive substance used have an average particle diameter of less than 0.1 μm.

Such conductive substances as illustrated above are described in detail in Japanese Patent L-O-P Publn. No. 11519/1988 "Process for preparing conductive powder" and Japanese Patent L-O-P Publn. No. 230617/1987 "Tin oxide sol and process for preparing same", both applied by the present applicant.

The organic solvent used in the present invention includes alcohols such as methanol, ethanol, propanol, butanol, diacetone alcohol, furfuryl alcohol, ethylene glycol and hexylene glycol, esters such as methyl acetate and ethyl acetate, ethers such as diethyl ether, ethylene glycol monomethyl ether, ethylene glycol monoethyl ether, ethylene glycol monobutyl ether, diethylene glycol monomethyl ether and diethylene glycol monoethyl ether, and ketones such as acetone and methyl ethyl ketone, which may be used either singly or in combination.

In the coating solution I composed of the above-mentioned components, a weight ratio of the conductive substance to the acetylacetonate chelate compound in terms of oxide thereof is preferably $0.5 \leq EO_x/M_1O_x \leq 5$ ($EO_x$ represents the conductive substance as oxide, and $M_1O_x$ represents the acetylacetonate chelate compound as oxide). If a value of this ratio is less than 0.5, conductivity of the resulting coating is not sufficient and, on the other hand, if this value exceeds 5, the resulting coating becomes poor in transparency, adhesion and resistance to scuffing, and the coating solution tends to become poor in preservability and continuous productivity.

A solids concentration calculated as $(EO_x + M_1O_x)$ in the coating solution I of the invention may be less than 15% by weight. If this value exceeds 15% by weight, the coating solution tends to become poor in preservability and, on the other hand, if the above-mentioned solids concentration is excessively low, several times of coating operation are required for obtaining a desired film thickness of the coating obtained thereby, and hence the solids concentration of at least 0.1% by weight is practically useful.

A water concentration in the coating solution I of the invention is preferably 0.1–50% by weight. If this value is less than 0.1% by weight, the acetylacetonate chelate compound present in the coating solution is not sufficiently hydrolyzed and unaltered product of the acetylacetonate chelate compound remains in the coating resulted therefrom, whereby adhesion between the resultant coating and a substrate comes to deteriorate. Further, the coating obtained tends to decrease in resistance to scuffing and durability. On the other hand, if this value exceeds 50% by weight, repulsion between the coating solution and the substrate takes place at the time of coating said coating solution on said substrate, whereby the formation of a coating becomes difficult.

The coating solution II of the present invention is formed by homogeneously dissolving or dispersing an acetylacetonate chelate compound (excluding dialkoxy-bisacetylacetonatozirconium), a silicon compound and a conductive substance in a mixture of water and an organic solvent.

The coating solution III of the present invention is formed by homogeneously dissolving or dispersing an acetylacetonate chelate compound, alkoxide of metal other than silicon, and a conductive substance in a mixture of water and an organic solvent.

Further, the coating solution IV of the present invention is formed by homogeneously dissolving or dispersing an acetylacetonate chelate compound, a silicon compound, alkoxide of metal other than silicon, and a conductive substance in a mixture of water and an organic solvent.

In the coating solutions II, III and IV of the invention mentioned above, the acetylacetonate chelate compound, conductive substance and mixture of water and an organic solvent used are the same as those used in the coating solution I of the invention. On that account, the silicon compound and alkoxide of metal other than silicon are illustrated hereinafter.

In this connection, the acetylacetonate chelate compound used in these coating solutions includes all the compounds represented by the aforementioned formula (I). However, the compound of the formula (I) in which $M_1$ is Zr, a is 2 and b is 2 corresponds to dialkoxy-bisacetylacetonatozirconium which has already been claimed in a separate patent application as filed previously by the present applicant. For this reason, in the coating solution II, this dialkoxy-bisacetylacetonatozirconium is excluded from the scope of the acetylacetonate chelate compound used in said coating solution.

In the coating solutions II, III and IV, it is presumed that the acetylacetonate chelate compound plays a role in improvement of dispersibility of the conductive substance and thermal stability of the coating solution, and functions as a protective colloid for the conductive substance.

The silicon compound used includes one or a combination of two or more selected from among the compounds represented by the following formula (II) or condensates thereof.

$$R_a-Si(OR')_{4-a} \qquad (II)$$

wherein R is $C_nH_{2n+1}-$ (n=1–4), hydrogen or halogen atom, a is 0–3, and R' is $C_nH_{2n+1}-$ (n=1–4), hydrogen atom or $C_nH_{2n+1}OC_2H_4-$ (n=1–4).

These silicon compounds may be used, as they are, or may be used after having been partially hydrolyzed. The silicon compounds may be partially hydrolyzed, for example, by the general procedure for partial hydrolysis of silicon compound which comprises mixing the silicon compound with methanol or ethanol and adding water and acid to the resulting mixture, thereby effecting partial hydrolysis. However, this partial hydrolysis is desirably carried out especially under such conditions as those mentioned below. The acid used includes hydrochloric acid, nitric acid, phosphoric acid, acetic acid or acetic anhydride, and the proportion of the acid to the silicon compound is preferably $0.01 \leq acid/SiO_2 \leq 0.5$ (a weight ratio when the silicon compound is expressed in terms of $SiO_2$). If this value is less than 0.01, a large amount of unaltered silicon compound remains, whereby the resulting coating tends to decrease in conductivity. On the other hand, if this value exceeds 0.5, the rate of partial hydrolysis becomes excessively fast, whereby continuous productivity and preservability of the coating solution tend to decrease. The proportion of water to the silicon compound is preferably water/the silicon compound $\geq 2$ (a molar ratio when the silicon compound is expressed in terms of $SiO_2$). If this value is less than 2, because of unaltered silicon compound remaining in the resulting coating, adhesion between the coating as formed and the substrate decreases, whereby the coating formed tends to decrease in resistance to scuffing and durability. The temperature at which the partial hydrolysis is carried out is desirably 30°–80° C.

The alkoxide of metal other than silicon used includes one or a combination of two or more selected from among compounds represented by the formula $M_2(OR)_n$ wherein $M_2$ is a metal other than silicon, R is alkyl or $C_nH_{2n}O-$ (n=3–10), and n is an integer equal to a valency of $M_2$, or condensates thereof. $M_2$ in the above formula may be of any metal other than silicon, and is preferably a metal selected from among elements belonging to Groups IB, IIA, B, IIIA, B, IVA, B, VA, B, VIA, B and VIII in the periodic table, especially from among Cu, Be, Ba, Zn, Al, B, In, Ga, Ti, Zr, Hf, Ge, Sn, Pb, V, Nb, Ta, Bi, Sb, Cr, W, Fe, Ni, Sc, Y, Ce and Te. Vanadyl (VO) is also preferably usable and defined as a metal other than silicon.

These alkoxides other than silicon alkoxide may be used, as they are, without subjecting to partial hydrolysis.

In the coating solutions II, III and IV composed of the above-mentioned components, the proportion of the acetylacetonate chelate compound to the conductive substance is preferably $0.001 \leq M_1O_x/EO_x \leq 1$ (a weight ratio in terms of oxide thereof). If this value is less than 0.001, the conductive substance decreases in dispersibility and the coating solution decreases in thermal stability, whereby the coating as formed tends to become poor in transparency and adhesion to the substrate and the coating solution tends to become poor in preservability and continuous productivity. On the other hand, if this value exceeds 1, the coating obtained tends to become poor in transparency and adhesion to the substrate or decrease in conductivity.

The proportion of the acetylacetonate chelate compound to the silicon compounds and/or alkoxide of metal other than silicon in terms of oxide thereof is preferably $0.001 \leq M_1O_x/A \leq 10$, wherein $M_1O_x$ is a weight of the acetylacetonate chelate compound in terms of oxide thereof, A is $SiO_2$ in the case of the coating solution II, is $M_2O_x$ in the case of the coating solution II, and is $SiO_2+M_2O_x$ in the case of the coating solution IV, provided that $M_2O_x$ is to represents alkoxide of metal other than silicon in terms of oxide thereof. If this value is less than 0.001, alkali resistance, acid resistance, resistance to saline solution and solvent resistance of the coating formed are not satisfactory and, on the other hand, if this value exceeds 10, the coating obtained tends to decrease in adhesion to the substrate and transparency.

In the coating solution IV, the proportion of the silicon compound to alkoxide of metal other than silicon is preferably $0.001 \leq M_2O_x/(M_2O_x+SiO_2) \leq 0.99$ (a weight ratio).

A proportion of the conductive substance in terms of oxide thereof is preferably $0.5 \leq EO_x/(A+M_1O_x) \leq 5$ (weight ratio). If this value is less than 0.5, conductivity of the coating formed is not satisfactory and, on the other hand, if this value exceeds 5, the coating formed tends to decrease in adhesion to the substrate and resistance to scuffing.

The solids concentration in the coating solutions II, III and IV should be less than 15% by weight calculated as $EO_x+A+M_1O_x$. If this value exceeds 15% by weight, the coating solution tends to become poor in preservability and, on the other hand, if the above-mentioned solids concentration is excessively low, it becomes necessary to repeat several times the coating operation and hence a practically useful solids concentration is at least 0.1% by weight.

The water concentration in the coating solutions II, III and IV is preferably 0.1-50% by weight. If this value is less than 0.1% by weight, partial hydrolysis among the acetylacetonate chelate compound, silicon compound and alkoxide of metal other than silicon is not sufficiently carried out, whereby adhesion between the coating and substrate decreases or the coating obtained tends to decrease in resistance to scuffing and durability. On the other hand, if this value exceeds 50% by weight, repulsion between the coating solution and substrate takes place at the time of applying said coating solution on said 10 substrate, whereby the formation of a coating becomes difficult.

Hereinafter, the processes for preparing the coating solutions I, II, III and IV are illustrated. The coating solution I may be prepared by mixing together the conductive substance, water, an organic solvent and the acetylacetonate chelate compound according to any method suitable therefor. The coating solutions II, III and IV may be prepared by adding at least one acetylacetonate chelate compound to a dispersion of the conductive substance in water and an organic solvent to improve said conductive substance in dispersibility and stability, and then adding thereto the silicon compound and/or alkoxide of metal other than silicon. Alternatively, these coating solutions II, III and IV may also be prepared by previously mixing the acetylacetonate chelate compound with the silicon compound and/or alkoxide of metal other than silicon, and then mixing the resultant mixture with the conductive substance. In these cases, contact of the silicon compound and/or alkoxide of metal other than silicon with the conductive substance before the addition of the acetylacetonate chelate compound is undesirable, because the conductive substance in contact therewith will agglomerate.

In the coating solutions I, II, III and IV of the present invention thus prepared, the conductive substance present in the coating solution is in a monodispersed state by the protective colloidal action of the acetylacetonate chelate compound, and accordingly coatings excellent in transparency and conductivity can be obtained therefrom. Because of improved thermal stability, moreover, these coating solutions do not gel at the time of continuous coating operation, and can be preserved for a long period of time even at a temperature of about 40° C.

In the present invention, there may be used transparent substrates composed of glass or plastics to which the above-mentioned coating solution I, II, III or IV is applied, and these substrates may be of any shape such as flat plate or plate with a curved surface. Substrates having a roughened surface, for example, ground glass, may also be used in the invention. This is because, when the coating solution is applied to the surface of the substrate with a roughened surface, the applied coating solution cover evenly the toughened surface of said substrate, whereby the covered surface becomes flat and the substrate becomes transparent. When the substrates with a roughened surface is used, adhesion between the coating and substrate is markedly improved.

Hereinafter, the substrate A is illustrated.

The substrate A comprises a substrate and thereon a transparent conductive ceramic coating formed from the above-mentioned coating solution I, II, III or IV, and has a surface resistance of $10^3$–$10^{11}$ Ω/□, a total light transmittance of at least 85% and a haze of less than 10%.

The substrate A may be prepared by coating the above-mentioned substrate with the aforementioned coating solution I, II, III or IV according to such coating method as dipping, spinner, spray, roll coater or flexographic printing to form a flat wet coating on the substrate, followed by drying and/or heating. After coating, the flat wet coating is dried at a temperature of from room temperature to about 110° C. whereby the substrate A having the coating and excellent in adhesion to the substrate, resistance to scuffing and transparency. When this dried coating is further heated at a temperature of above 120° C. and below the glass transition point of the substrate, the substrate A improved further in durability is obtained. In this case, the heating may be repeated any times at a temperature so long as the temperature is below the glass transition point of the substrate.

In the present invention, the substrate A having further remarkable effects is obtained when it is prepared by the processes as will be mentioned hereinafter.

Of the processes as referred to above, the first process for preparing the substrate A comprises irradiating the substrate with an electromagnetic wave having a wavelength shorter than that of visible light after and/or during at least one of the steps (1) of coating the substrate with the coating solution, (2) of drying the coating formed on said substrate and (3) of heating the dried coating. By virtue of irradiation of the coating with the electromagnetic wave, a lower heating temperature of the coating can be employed. For example, a coating obtained by irradiation with the above-mentioned electromagnetic wave followed by heating at a temperature of 300° C. is found to be equal in performance characteristics to a coating obtained by heating at a temperature of 400° C. without irradiation with the electromagnetic wave.

The electromagnetic wave having a wavelength shorter than that of visible light as referred to above includes ultraviolet rays, electron rays, X-rays, $\gamma$-rays and the like, and among these rays, ultraviolet rays are practically useful. As a source of ultraviolet rays, there may be used desirably a high pressure mercury-vapor lamp having an emission maximum at about 250 nm and 360 nm and an irradiation intensity of at least 10 mW/cm$^2$, preferably 100 mW/cm$^2$. A high durability coating is obtained at low temperatures when the coating is irradiated with irradiation energy of at least 100 mJ/cm$^2$, preferably at least 1000 mJ/cm$^2$ using such a source of ultraviolet rays as mentioned above.

In the second process for preparing the substrate A, the surface of the coating formed on the substrate A obtained in the manner as mentioned above is further coated with a coating solution for forming a transparent protective coating according to such coating method as dipping, spinner, spray, roll coater, flexographic printing or the like, followed by drying and/or heating. The coating solution for forming a transparent protective coating used in this case may be of any coating solution so long as it gives a transparent protective coating consisting essentially of SiO$_2$ and/or ZrO$_2$. For example, useful coating solutions include those containing partial hydrolyzate of alkoxide of silicon or zirconium, a chelate compound of silicon or zirconium, oxysalt of zirconium and the like. The coating solution I, II, III or IV of the present invention, from which the conductive substance has been excluded, may also be used.

In the third process for preparing the substrate A, the transparent protective coating obtained in the manner as the above-mentioned second process is irradiated with an electromagnetic wave having a wavelength shorter than that of visible light after and/or during at least one of the steps (1) of applying the coating solution for forming a transparent protecting coating, (2) of drying the transparent protective coating as formed and (3) of heating the dried transparent protective coating.

The substrate A thus prepared has a surface resistance of 10$^3$–10$^{11}$ Ω/□, a total light transmittance of at least 85% and a haze of less than 10%. If the surface resistance of the substrate A exceeds 10$^{11}$ Ω/□, no sufficient antistatic effect is obtained. If the total light transmission and haze fail to satisfy their respective numerical values as defined above, the substrate A becomes poor in transparency.

Figure 2:
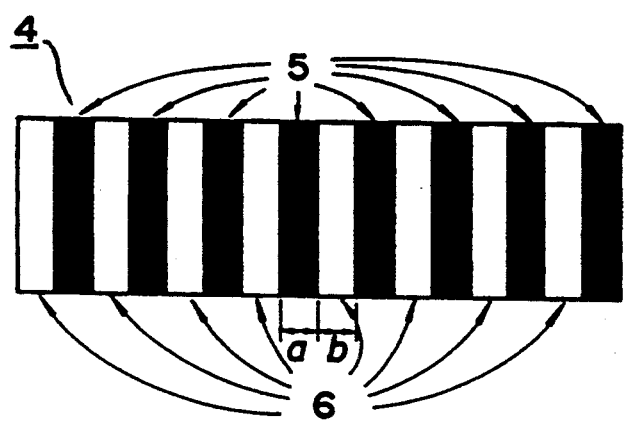
FIG. 2 is a view illustrating a bar chart used in the determination of resolving power of substrate.
Figure 3:
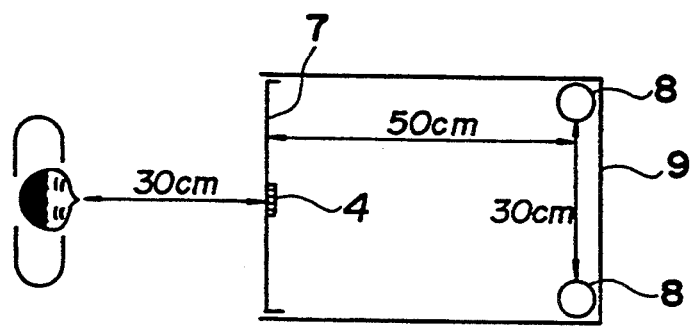
FIG. 3 is a view illustrating a device used in the determination of resolving power of substrate.

In the displaying device A having as a face-plate the substrate A of the present invention, the substrate A as the face-plate desirably has a resolving power of at least 50 bars/cm in addition to its performance characteristics mentioned above. This resolving power is determined by the following procedure. That is, a bar chart 4 as shown in FIG. 2 is attached to a side 7 having no coating of the substrate A, and this substrate A is arranged in a box 9 of 50 cm in width and 30 cm in length so that the coated side of the substrate A is exposed outside the box 9 in the manner as shown in FIG. 3 to ascertain how many bars separated per cm can visually be confirmed at a distance of 30 cm from the substrate A. The number of bars separated per cm that can visually be confirmed was taken as a resolving power of the substrate A. In this case, the inner walls of the box 9 were colored white, and fluorescent lamps 8 of 20W were provided on both sides of the inner wall of the box 9 opposite to the substrate A. The bar chart used included those prepared by increasing the number of bars every 5 bars/cm, for example, those having 10 bars/cm, 15 bars/cm, 20 bars/cm, 25 bars/cm and the like. In the bar chart, 5 is a printed bar portion, 6 is a space between the bars, and a width a of the printed portion is equal to a width b of the space.

In the copy machine using the substrate A of the present invention as a platen glass, said substrate A desirably has a light transmittance at a wavelength of 550 nm which does not exceed ±5% based on the light transmittance of the substrate A as measured before forming a coating thereon.

The coating formed on this substrate A is composed of ceramics and very difficult to scrape off, however, a kind of flaw is left on the coating when part of said coating is scraped off by the document to be fed to ADF or by a rubber belt fitted to ADF, and becomes thinner or the substrate before coating is exposed.

When a difference in light transmittance at a wavelength of 550 nm between the flaw portion of the coating and the substrate before coating exceeds +5%, this flaw portion appears as a spot on the copies obtained by operating at a gray scale a copy machine having such substrate A as mentioned above as a platen glass.

Accordingly, in the case where the substrate A is used as a platen glass of copy machine, when values of light transmittance at a wavelength of 550 nm of the substrate A, the flaw portion and the substrate A before coating are taken as Tt$_1$ (%), Tt$_2$ (%) and Tt$_0$ (%), respectively, it is desirable that both Tt$_1$−Tt$_0$ and Tt$_2$−Tt$_0$ do not exceed ±5%, preferably ±3%.

In the present invention, when the substrate A is used as a platen glass of copy machine, a substrate used, on which the coating of the substrate A is formed, may be of any substrate for platen glass used in copy machine.

Hereinafter, the substrate B of the present invention is illustrated.

The substrate B comprises a substrate and thereon a transparent conductive ceramic coating formed from the above-mentioned coating solution I, II, III or IV, and has a surface resistance of 10$^3$–10$^{11}$ Ω/□ and a glossiness of 30–100%.

In the first process for preparing the substrate B mentioned above, the above-mentioned coating solution I, II, III or IV is applied to the surface of a substrate preheated at 40°–90° C., preferably 50°–70° C. to form an uneven wet coating on the substrate, followed by drying and/or heating.

When the substrate is kept by preheating at a temperature below 40° C. in that case, the coating solution being applied is not sufficiently dried and undergoes leveling, whereby a flat wet coating is formed and tends to fail of its being anti-glare. On the other hand, if the substrate is kept at a temperature exceeding 90° C., the coating solution applied to the substrate is abruptly dried, whereby the dried coating tends to decrease in adhesion to the substrate, transparency and durability. At the time when the substrate is coated with the coating solution in the manner as mentioned above, it is desirable to control the amount of coating solution and coating speed so that the temperature at which the substrate is kept by preheating does not deviate from the temperature range as defined above. After coating, the coating formed is dried at a temperature of from ordinary temperature to about 110° C. to obtain the substrate B having formed thereon a dry coating excellent in adhesion to the substrate, resistance to scuffing and transparency. This dry coating as formed is further heated at a temperature above 120° C. and below the glass transition point of the substrate, to obtain the substrate B having a heated film improved in durability. In this case, the dry coating formed on the substrate by the previous step may be heated repeatedly at a temperature below the glass transition point of the substrate.

In the second process for preparing the substrate B, said process being the same as the above-mentioned first process for preparing the substrate B, the coating to be formed is irradiated with an electromagnetic wave having a wavelength shorter than that of visible light after and/or during at least one of the steps (1) of applying the coating solution on the substrate, (2) of drying the wet coating as formed and (3) of heating the dried coating. By virtue of the irradiation with the electromagnetic wave as mentioned above, a lower heating temperature can be employed. For example, a coating obtained by irradiation with the electromagnetic wave followed by heating at a temperature of 300° C. is found to be equal in performance characteristics to a coating obtained by heating at a temperature of 400° C. without irradiation with the electromagnetic wave.

In the third process for preparing the substrate B, the aforementioned substrate A having no transparent protective coating formed thereon and the substrates B obtained by the above-mentioned first and second processes, respectively, were kept by further preheating at 40°-90° C., and coated with a coating solution for forming a transparent protective coating to form an uneven wet coating, followed by drying and/or heating. The coating solution for forming a transparent protective coating used in that case may be the same as used in the second process for preparing the substrate A.

In the fourth process for preparing the substrate B, said process being the same as the above-mentioned third process for preparing the substrate B, the transparent protective coating to be formed is irradiated with an electromagnetic wave having a wavelength shorter than that of visible light after and/or during at least one of the steps (1) of applying the coating solution for forming a transparent protective coating on the substrate B, (2) of drying the transparent protective coating as formed and (3) of heating the dried transparent protective coating.

The electromagnetic wave having a wavelength shorter than that of visible light used in the second and fourth processes for preparing the substrate B is the same as that used in the processes for preparing the substrate A.

In the processes for preparing the substrate B, the coating solution is desirably coated on the substrate by the spray method.

The substrate B obtained in the manner as mentioned above has a surface resistance of $10^3$–$10^{11}$ $\Omega/\square$ and a glossiness of 30–100% as measured at an angle of 60° according to the method of measurement of glossiness as stipulated in JIS K7105-81.

In the displaying device B using the substrate B of the present invention as a face-plate, the substrate B as a face-plate desirably has a resolving power of at least 50 bars/cm in addition to the aforementioned performance characteristics. This resolving power is measured by the same procedure as employed in the substrate A used as a face-plate.

The glossiness of the substrate B is a value as measured at an angle of 60° according to the method of measurement of glossiness stipulated in JIS K7105-81 as aforesaid. If this value is less than 30%, the substrate B tends to decrease in transparency and, on the other hand, if this value, though its upper limit is not particularly defined, exceeds 100%, the substrate will not come to be anti-glare, and said value is desirably less than 100%.

The substrate B desirably has an average surface roughness $R_z$ (a ten-point average roughness as measured in accordance with JIS B0601-82) of 0.2–5.0 μm. If this average roughness is less than 0.2 μm, the substrate B, though excellent in resolving power and transparency, decreases in anti-glare characteristics and tends to fail to obtain sufficient antistatic effect and, on the other hand, if said average roughness exceeds 5.0 μm, the substrate B tends to decrease in resolving power and transparency.

EFFECT OF THE INVENTION

The coating solution of the present invention is formed by homogeneously dissolving or dispersing an acetylacetonate chelate compound and a conductive substance as aforesaid in a mixture of water and an organic solvent, or by homogeneously dissolving or dispersing an acetylacetonate chelate compound, a silicon compound and/or alkoxide of metal other than silicon, and a conductive substance in a mixture of water and an organic solvent.

Accordingly, the coating solutions of the present invention are capable of forming a coating excellent in transparency and conductivity, because the conductive substance present in the coating solution is kept in a monodispersed state by the protective colloidal action of the acetylacetonate chelate compound. Because of improved thermal stability, the coating solutions will not undergo gellation at the time of continuous coating operation thereof, and can be preserved for a long period of time even at a temperature of about 40° C.

The substrates A and B of the present invention having on the substrate thereof a coating composed of a metal oxide such as zirconia or silica and a conductive substance are excellent in resistance to scuffing, adhesion to the substrate and durability.

The substrate A of the present invention has a surface resistance of $10^3$–$10^{11}$ $\Omega/\square$, a total light transmittance of at least 85% and a haze of less than 10%, and the substrate B of the invention has a surface resistance of $10^3$–$10^{11}$ $\Omega/\square$ and a glossiness of 30–100% as measured at an angle of 60° according to the method of measurement of glossiness as stipulated in JIS K7105-81, thus both substrates A and B are excellent in transparency, antistatic effect and anti-glare.

In the displaying device A having the substrate A of the present invention as a face-plate, a resolving power of the substrate A as a face-plate is at least 50 bars/cm, and in the displaying device B having the substrate B as a face-plate, a resolving power of the substrate B as a face-plate is at least 50 bars/cm.

In the copy machine using the substrate A of the invention as a platen glass, because a light transmittance at a wavelength of 550 nm of the substrate A as a platen glass does not exceeds ±5% of a light transmittance of the substrate prior to coating, even when part of the coating becomes thinner by scraping or part of the coating is completely scraped off, the scraped portion of the coating will not appear as a spot on the copy resulting from the copy machine operated at a gray scale.

Accordingly, the substrates with a transparent conductive ceramic coating of the present invention can be applied to the field wherein antistatic function and anti-glare are required, for example, a face-plate of displaying device such as CRT, FIP, PDP or LCD, a platen glass of copy machine, a panel for measuring instrument, telewriting terminal and lens.

This face-plate may be such as constituting the displaying device itself, or may be arranged in front of the displaying device. Concretely, in the case of LCD, the transparent conductive ceramic coating may be formed directly on the surface of one of the substrates with electrodes holding the liquid crystal therebetween and positioned in front of LCD, or the substrate having formed thereon the transparent conductive ceramic coating of the invention may be arranged in front of the substrate with an electrode on front side. In the case of CRT, the transparent conductive ceramic coating of the present invention may be formed directly on a displaying panel of CRT, or the substrate having formed thereon the transparent conductive ceramic coating may be arranged in front of the displaying panel.

The present invention is illustrated below with reference to examples, but it should be construed that the invention is in no way limited to those examples.

EXAMPLES 1~6

Coating solution I

Coating solutions for forming transparent conductive ceramic coatings (coating solutions 1-6) as shown in Table 1 were obtained by stirring mixtures comprising the following acetylacetonate chelate compounds, conductive substances and organic solvents.
[Acetylacetonate chelate compound ($M_1O_x$)]
(1) ZABI A butanol solution containing 15% by weight of dibutoxy-bisacetylacetonatozirconium in terms of $ZrO_2$.
(2) TAPI A butanol solution containing 10% by weight of dibutoxy-bisacetylacetonatotitanium in terms of $TiO_2$.
[Conductive substance ($EO_x$)]
(1) TL93

Tin oxide sol doped with antimony (a product sold under the trade name of ELCOM TL-93 by Shokubai Kasei Kogyo K.K., solids concentration 20% by weight, average particle diameter 0.07 μm, particles of lees than 1 μm amounting to 87% of the total particle)
(2) TL30

A water dispersion of particulate tin oxide doped with antimony (a product sold under the trade name of ELCOM TL-30 by Shokubai Kasei Kogyo K.K., solids concentration 20% by weight, average particle diameter 0.2 μm)
[Organic Solvent]
Ethanol (EtOH) and isopropanol (IPA)

TABLE 1

| Example No. | $M_1O_x$ | g | $EO_x$ | g | Organic solvent | g |
|---|---|---|---|---|---|---|
| 1 | ZABl | 100 | TL93 | 65 | EtOH | 355 |
| 2 | ZABl | 100 | TL93 | 130 | EtOH | 550 |
| 3 | ZABl | 100 | TL93 | 325 | EtOH | 1135 |
| 4 | ZABl | 100 | TL93 | 65 | EtOH | 95 |
| 5 | TAPl | 100 | TL93 | 50 | IPA | 250 |
| 6 | TAPl | 100 | TL30 | 100 | IPA | 800 |

EXAMPLES 7~21

Coating solution II

Coating solutions for forming transparent conductive ceramic coatings (coating solutions 7-21) as shown in Table 3 were obtained by mixing together the following acetylacetonate chelate compounds, conductive substances and organic solvents, followed by adding the following silicon liquids.
[Acetylacetonate chelate compound ($M_1O_x$)
(1) ZABI (same as used in Examples 1-6)
(2) ZAB2

A butanol solution containing 10% by weight of $Zr(OC_4H_9)_{1.5} \cdot (Ac)_{2.5}$(Ac: acetylacetone ion) in terms of $ZrO_2$.
(3) ZAB3

A butanol solution containing 10% by weight of tributoxy-monoacetylacetonatozirconium in terms of $ZrO_2$.
(4) TAPI (same as used in Examples 1-6)
(5) TAP2

An IPA solution containing 10% by weight of triisopropoxy monoacetylacetonatotitanium in terms of $TiO_2$.
(6) HFAB A butanol solution containing 10% by weight of dibutoxy-bisacetylacetonatohafnium in terms of $HfO_2$.
[Conductive substance]
(1) TL93 and TL30 (same as used in Examples 1-6)
(2) TL130

A water dispersion of particulate indium oxide doped with tin (a product sold under the trade name of ELCOM TL-130 by Shokubai Kasei Kogyo K.K., solids concentration 25% by weight, average particle diameter 0.25 μm)
[Silicon liquid]
(1) Silicon liquids A–D, and F An ethanol solution containing 28% by weight of tetraethoxysilane in terms of $SiO_2$ (ethyl silicate 28, a product of Tama Kagaku Kogyo K.K., called ES-28 for short) or an ethanol solution containing 40% by weight of tetraethoxysilane in terms of $SiO_2$ (a product of the same company as mentioned above, called ES-40 for short) were respectively incorporated with ethanol and further with an aqueous solution of nitric acid. These mixtures obtained were individually heated for a predetermined period of time and then cooled to room temperature to obtain the title silicon liquids as shown in Table 2.

(2) Silicon liquid E 1000 g of an aqueous solution of sodium silicate ($SiO_2/Na_2O=3$ mol/mol) containing 5% by weight of $SiO_2$ was kept at 15° C. and passed, as it was, through a cation exchange resin column. To this solution was added 445 g of methyl cellosolve, and the mixture was thoroughly dispersed. The mixture was then heated at 70° C. by means of a rotary evaporator to distilled off 945 g of water under reduced pressure, whereby the silicon liquid E was obtained.

TABLE 2

| Silicon liquid | $SiO_2$ source | solvent (EtOH) g | Nitric acid Wt % | Nitric acid g | Heating conditions °C. | Heating conditions h |
|---|---|---|---|---|---|---|
| A | ES-28 | 416 | 484 | 4.0 | 300 | 50 | 1.0 |
| B | ES-40 | 74.4 | 144.6 | 11.1 | 81 | 50 | 1.0 |
| C | ES-40 | 74.4 | 135.6 | 0.4 | 90 | 60 | 0.5 |
| D | ES-40 | 744 | 2100 | 2.0 | 600 | 60 | 0.5 |
| F | ES-40 | 74.4 | 147.6 | 4.4 | 78 | 40 | 2.0 |

TABLE 3

|  | $M_1O_x$ |  | $EO_x$ |  | Organic solvent |  | Silicon liquid |  |
|---|---|---|---|---|---|---|---|---|
|  |  | g |  | g |  | g |  | g |
| Example 7 | ZAB2 | 100 | TL93 | 550 | EtOH | 2750 | A | 1000 |
| Example 8 | ZAB2 | 100 | TL93 | 300 | EtOH | 300 | B | 200 |
| Example 9 | ZAB2 | 100 | TL93 | 225 | EtOH | 900 | C | 125 |
| Example 10 | ZAB2 | 100 | TL93 | 550 | EtOH | 2750 | D + E | 1000 |
| Example 11 | ZAB3 | 100 | TL130 | 550 | IPA | 2400 | F | 300 |
| Example 12 | TAP1 ZAB1 | 100 692 | TL93 | 4330 | EtOH | 17528 | A | 3330 |
| Example 13 | TAP1 ZAB1 | 100 692 | TL93 | 6675 | IPA | 88296 | A | 1670 |
| Example 14 | TAP1 ZAB1 | 100 19 | TL93 | 133 | MeBu | 160 | B | 140 |
| Example 15 | TAP2 ZAB1 | 100 77 | TL30 | 900 | EtOH | 6523 | B | 400 |
| Example 16 | ZAB3 ZAB1 | 100 692 | TL93 | 4330 | EtOH | 17528 | A | 3330 |
| Example 17 | HFAB | 10 | TL93 | 210 | EtOH | 840 | A | 200 |
| Example 18 | HFAB | 10 | TL93 | 165 | EtOH | 1925 | A | 100 |
| Example 19 | TAP1 | 100 | TL93 | 563 | IPA | 563 | B | 125 |
| Example 20 | TAP1 | 100 | TL93 | 215 | IPA | 1075 | B | 330 |
| Examlpe 21 | ZAB2 | 1 | TL93 | 1000 | EtOH | 5169 | B | 1000 |

Note 1) The silicon liquid used in Example 10 is a mixture of 500 g each of D and E in liquids.
Note 2) The organic solvent used in Example 14 is a mixed solvent of methanol and butanol (weight ratio 1/1).

EXAMPLES 22~26

Coating solution III

Coating solutions for forming transparent conductive ceramic coatings (coating solutions 22–26) as shown in Table 4 were obtained by mixing together the following acetylacetonate chelate compound, conductive substance and organic solvents, followed by adding the following metal alkoxides.
[Acetylacetonate chelate compound]
(1) AAC A solution of 5% by weight of trisacetylacetonatoaluminum in terms of $Al_2O_3$ in an ethanol/toluene mixed solvent (weight ratio 1/1).
[Conductive substance]
(1) TL94

Tin oxide sol doped with phosphorus (a product sold under the trade name ELCOM TL-94 by Shokubai Kasei Kogyo K.K., solids concentration 20% by weight, average particle diameter 0.07 μm, particles of less than 0.1 μm amounting to 87% of the total particle)
[Metal alkoxide ($M_2O_x$)]
(1) TBZR A butanol solution containing 10% by weight of tetrabutoxy zirconium in terms of $ZrO_2$.
(2) TPTI An IPA solution containing 10% by weight of tetraisopropoxy titanium in terms of $TiO_2$.

TABLE 4

| Example No. | $M_1O_x$ |  | $M_2O_x$ |  | $EO_x$ |  | Organic solvent |  |
|---|---|---|---|---|---|---|---|---|
|  |  | g |  |  |  | g |  |  |
| 22 | AAC | 100 | TBZR | 63 | TL94 | 169.5 | EtOH | 571.5 |
| 23 | ZAB3 | 100 | TPTI | 200 | TL93 | 300 | EtOH | 525 |
| 24 | ZAB3 | 100 | TPTI | 100 | TL93 | 275 | MeBu | 1815 |
| 25 | ZAB3 | 100 | TPTI | 100 | TL130 | 130 | Me-cello | 130 |
| 26 | ZAB3 | 1 | TBZR | 1000 | TL93 | 500 | EtOH | 5169 |

Note) Me-cello is methyl cellosolve

EXAMPLES 27~32

Coating solution IV

Coating solutions for forming transparent conductive ceramic coatings (coating solutions 27–32) as shown in Table 5 were obtained by mixing together the following acetylacetonate chelate compounds, conductive substances and organic solvents, followed by addition to the mixture of silicon liquids and metal alkoxides.
[Acetylacetonate chelate compound]
(1) COA A solution of 10% by weight of bisacetylacetonatocobalt in terms of CoO in a toluene/acetone mixed solvent (weight ratio 1/1)
[Metal alkoxide]
(1) PETA An ethanol solution containing 5% by weight of pentaethoxy tantalum in terms of $Ta_2O_5$.

The coating solution 30 of Example 30 was prepared by the following procedure.

A mixture comprising predetermined amounts of TAPI, TL30 and ethanol was prepared. Separately, a mixture comprising 250 g of an IPA solution (TMS) containing 10% by weight of monomethyl trimethoxysilane in terms of $SiO_2$, 250 g of TPTI, 2.5 g of acetic anhydride and 60 g of water was prepared. This mixture was added to the above-mentioned mixture, and the resulting mixture was thoroughly stirred to obtain the coating solution 30.

Glossiness (G) was measured at an angle of 60° according to the method of measurement of glossiness as stipulated in JIS K7105-81. In this case, the back of the substrate to be measured was colored black or pasted with a black tape in order to avert the influence of reflected light therefrom.

(5) Adhesion:

A part of a commercially available adhesive cellophane tape of a 12 mm width was applied to the coating, the remainder of the tape was held perpendicular to the coating, and the tape was abruptly peeled off therefrom to visually inspect the coating remaining on the panel glass.

TABLE 5

| Example No. | $M_1O_x$ | | $M_2O_x$ | | Silicon liquid | | $EO_x$ | | Organic Solvent | |
|---|---|---|---|---|---|---|---|---|---|---|
| | | g | | g | | g | | g | | g |
| 27 | ZAB3 | 10 | TBZR | 20 | A | 80 | TL93 | 110 | EtOH | 400 |
| 28 | ZAB3 | 100 | TBZR | 83 | B | 83 | TL93 | 400 | EtOH | 667 |
| 29 | ZAB3 | 10 | TBZR | 90 | B | 10 | TL93 | 220 | EtOH | 220 |
| 30 | TAP1 | 100 | TPTI | 250 | TMS | 250 | TL30 | 300 | EtOH | 3037.5 |
| 31 | COA | 10 | PETA | 40 | A | 80 | TL94 | 110 | MeBu | 420 |
| 32 | ZAB3 | 1 | TBRZ | 1 | B | 1000 | TL93 | 500 | EtOH | 5171 |

EXAMPLES 33-1 ~ 33-32

Coatings were formed respectively on panel glasses for 14-inch cathode-ray tube by coating said panel glasses with the coating solutions for forming transparent conductive ceramic coatings obtained in Examples 1-32 under the conditions as shown in Table 6. The panel glasses thus coated were evaluated item-by-item by the following procedures.

Results obtained are shown in Tables 7 and 8, respectively.

(1) Transparency:

Total light transmittance (Tt) at a wavelength of 550 nm, and haze (H) were measured by means of a haze computer (manufactured by Suga Shikenki K.K.)

(2) Surface resistance (Rs):

Surface resistance (Rs) was measured by means of Hiresta (voltage applied: 500V) or Loresta (voltage applied: 10–90V) manufactured by Mitsubishi Yuka K.K.).

(3) Resolving power:

A bar chart as shown in FIG. 2 is attached to a side having no coating of the substrate, and this substrate is arranged in a box in such a manner as shown in FIG. 3 so that the coated side of the substrate is exposed outside the box. The number of bars separated per cm that can be visually confirmed was taken as a resolving power of the substrate. In this case, the bar chart used included those prepared by increasing the number of bars every 5 bar/cm, for example, those having 10, 15, 20 and 25 bar/cm.

(4) Glossiness (G):

(6) Film strength:

The panel glass was fixed onto a platform scale, an eraser for office (equivalent to LION No. 50-50) was put on the coating on said panel glass, and the eraser was reciprocated 150 times under a load of 2 kg to rub the surface of the coating, and then a surface resistance (Rs) and glossiness (G) of the thus rubbed panel glass were measured.

(7) Average roughness (Rz):

Average roughness (Rs) was determined in accordance with the method of measurement of Rz as stipulated in JIS B0601-82 using a film thickness meter (sold under the trade name of Taly Step by Rank Tylor Hobson Co.).

(8) Durability:

The coated panel glass was immersed in the following seven kinds of liquids to evaluate adhesion between the coating and the panel glass. The glossiness and surface resistance of the coated panel glass measured before the durability test were compared with those measured after the test.

1) Immersion for 120 hours at room temperature in 15% by weight of aqueous ammonia.
2) Immersion for 120 hours at room temperature in 10% by weight of aqueous NaCl solution.
3) Immersion for 30 minutes in boiling water.
4) Immersion for 120 hours at room temperature in 50% by weight of aqueous acetic acid solution.
5) Immersion for 1 week at room temperature in acetone.
6) Immersion for 1 week at room temperature in ethanol.
7) Immersion for 1 week at room temperature in n-propanol.

TABLE 6

| Example | Coating solution | Coating method | Preheating °C. | Drying °C. | Drying min. | Heating °C. | Heating min. | UV irradiation | Protective solution | Coating method | Preheating °C. | Drying °C. | Drying min. | Heating °C. | Heating min. | UV irradiation |
|---|---|---|---|---|---|---|---|---|---|---|---|---|---|---|---|---|
| 33-1 | 1 | SP | 60 | 120 | 5 | 250 | 30 | — | — | — | — | — | — | — | — | — |
| 33-2 | 2 | SP | 60 | 120 | 5 | 200 | 30 | (1) | — | — | — | — | — | — | — | — |
| 33-3 | 3 | SP | 70 | 120 | 5 | — | — | — | A | SP | 60 | 120 | 5 | 150 | 30 | — |
| 33-4 | 4 | SN | — | 120 | 5 | 300 | 30 | — | — | — | — | — | — | — | — | — |
| 33-5 | 5 | SP | 60 | 120 | 5 | — | — | — | B | SP | 70 | 120 | 5 | 200 | 30 | (1) |
| 33-6 | 6 | SN | — | 120 | 5 | — | — | — | C | SN | — | 120 | 5 | 150 | 30 | — |

TABLE 6-continued

| Example | Coating solution | Coating method | Pre-heating °C. | Drying °C. | Drying min. | Heating °C. | Heating min. | UV irradiation | Protective solution | Coating method | Pre-heating °C. | Drying °C. | Drying min. | Heating °C. | Heating min. | UV irradiation |
|---|---|---|---|---|---|---|---|---|---|---|---|---|---|---|---|---|
| 33-7 | 7 | SN | — | 120 | 5 | 200 | 30 | (1) | — | — | — | — | — | — | — | — |
| 33-8 | 8 | SN | — | 120 | 5 | — | — | — | F | SN | — | 120 | 5 | 200 | 30 | (1) |
| 33-9 | 9 | SN | — | 120 | 5 | — | — | — | D | SP | 60 | 120 | 5 | 200 | 30 | — |
| 33-10 | 10 | SN | — | 120 | 5 | — | — | (1) | A | SP | 60 | 120 | 5 | 150 | 30 | (1) |
| 33-11 | 11 | SP | 80 | 120 | 5 | — | — | (1) | B | SP | 50 | 120 | 5 | 200 | 30 | (1) |
| 33-12 | 12 | SP | 60 | 120 | 5 | — | — | (1) | — | — | — | — | — | — | — | — |
| 33-13 | 13 | SP | 80 | 120 | 5 | — | — | — | E | SP | 70 | 120 | 5 | 180 | 30 | (2) |
| 33-14 | 14 | SN | — | 120 | 5 | — | — | (1) | — | — | — | — | — | — | — | — |
| 33-15 | 15 | SN | — | 120 | 5 | — | — | — | A | SN | — | 120 | 5 | 250 | 30 | (2) |
| 33-16 | 16 | SN | — | 120 | 5 | — | — | — | B | SP | 80 | 120 | 5 | 150 | 30 | (2) |
| 33-17 | 17 | SP | 70 | 120 | 5 | 200 | 30 | — | C | SP | 60 | 120 | 5 | 150 | 30 | — |
| 33-18 | 18 | SP | 60 | 120 | 5 | 150 | 30 | (1) | D | SP | 60 | 120 | 5 | 150 | 30 | (1) |
| 33-19 | 19 | SN | — | 120 | 5 | 250 | 30 | — | A | SN | — | 120 | 5 | 200 | 30 | — |
| 33-20 | 20 | SN | — | 120 | 5 | 200 | 30 | — | A | SP | 80 | 120 | 5 | 200 | 30 | — |
| 33-21 | 21 | SP | 60 | 120 | 5 | 200 | 30 | — | — | — | — | — | — | — | — | — |
| 33-22 | 22 | SN | — | 120 | 5 | 200 | 30 | (1) | A | SN | — | 120 | 5 | 200 | 30 | (1) |
| 33-23 | 23 | SN | — | 120 | 5 | 150 | 30 | (2) | C | SP | 60 | 120 | 5 | 150 | 30 | (1) |
| 33-24 | 24 | SP | 90 | 120 | 5 | 250 | 30 | — | C | SP | 50 | 120 | 5 | 200 | 30 | (2) |
| 33-25 | 25 | SN | — | 120 | 5 | 200 | 30 | — | B | SN | — | 120 | 5 | 180 | 30 | (2) |
| 33-26 | 26 | SP | 60 | 120 | 5 | 200 | 30 | — | — | — | — | — | — | — | — | — |
| 33-27 | 27 | SP | 80 | 120 | 5 | 170 | 30 | — | — | — | — | — | — | — | — | — |
| 33-28 | 28 | SN | — | 90 | 5 | 400 | 30 | — | — | — | — | — | — | — | — | — |
| 33-29 | 29 | SN | — | 120 | 5 | 400 | 30 | (1) | — | — | — | — | — | — | — | — |
| 33-30 | 30 | SP | 60 | 120 | 5 | 150 | 30 | — | A | SP | 60 | 120 | 5 | 350 | 30 | — |
| 33-31 | 31 | SP | 60 | 120 | 5 | 200 | 30 | (1) | B | SP | 60 | 120 | 5 | 200 | 30 | (1) |
| 33-32 | 32 | SP | 60 | 120 | 5 | 200 | 30 | — | — | — | — | — | — | — | — | — |

(1) After drying
(2) After heating
SP: Spray, Conditions: Feeding air pressure of spray = 2 kg/cm$^2$, Coating volume = 20 ml.
SN: Spiner, Conditions: 1000 r.p.m.;
UV irradiation condition: 210 mW/cm$^2$, irradiation for 3 minutes with 2 kW high pressure mercury-vapor lamp.

TABLE 7

| Example | Tt % | H % | Resolving power bar/cm | G % | Rs Ω/□ | Adhesion | Film strength Rs Ω/□ | G % | Rz μm |
|---|---|---|---|---|---|---|---|---|---|
| 33-1 | 91.5 | — | 65 | 65 | $5 \times 10^8$ | O | $8 \times 10^8$ | 70 | 1.02 |
| 33-2 | 90.5 | — | 65 | 63 | $1 \times 10^7$ | O | $5 \times 10^7$ | 66 | 1.05 |
| 33-3 | 92.3 | — | 70 | 62 | $1 \times 10^6$ | O | $1 \times 10^6$ | 65 | 0.98 |
| 33-4 | 91.2 | 0.6 | 70 | 148 | $2 \times 10^8$ | O | $6 \times 10^8$ | 144 | 0.02 |
| 33-5 | 91.9 | — | 75 | 68 | $5 \times 10^8$ | O | $5 \times 10^8$ | 69 | 1.12 |
| 33-6 | 92.1 | 3.5 | 60 | 130 | $3 \times 10^6$ | O | $3 \times 10^6$ | 140 | 0.08 |
| 33-7 | 91.4 | 1.6 | 70 | 151 | $1 \times 10^8$ | O | $2 \times 10^8$ | 149 | 0.03 |
| 33-8 | 92.3 | 0.3 | 75 | 145 | $7 \times 10^6$ | O | $7 \times 10^6$ | 145 | 0.01 |
| 33-9 | 92.4 | — | 70 | 65 | $7 \times 10^7$ | O | $7 \times 10^7$ | 69 | 0.89 |
| 33-10 | 92.8 | — | 75 | 67 | $3 \times 10^8$ | O | $3 \times 10^8$ | 66 | 0.74 |
| 33-11 | 92.4 | — | 55 | 35 | $5 \times 10^4$ | O | $8 \times 10^4$ | 42 | 1.45 |
| 33-12 | 91.5 | — | 70 | 66 | $7 \times 10^6$ | O | $8 \times 10^6$ | 68 | 0.94 |
| 33-13 | 92.2 | — | 75 | 54 | $5 \times 10^6$ | O | $5 \times 10^6$ | 53 | 1.05 |
| 33-14 | 91.0 | 0.8 | 70 | 153 | $9 \times 10^7$ | O | $2 \times 10^8$ | 150 | 0.02 |
| 33-15 | 92.4 | 1.5 | 60 | 132 | $1 \times 10^6$ | O | $2 \times 10^6$ | 136 | 0.07 |
| 33-16 | 91.9 | — | 70 | 62 | $6 \times 10^6$ | O | $6 \times 10^6$ | 64 | 0.83 |
| 33-17 | 92.1 | — | 75 | 53 | $8 \times 10^6$ | O | $8 \times 10^6$ | 51 | 1.10 |
| 33-18 | 92.0 | — | 75 | 55 | $2 \times 10^6$ | O | $2 \times 10^6$ | 54 | 0.84 |
| 33-19 | 91.9 | 0.4 | 75 | 158 | $8 \times 10^5$ | O | $9 \times 10^5$ | 155 | 0.01 |
| 33-20 | 92.4 | — | 70 | 65 | $3 \times 10^8$ | O | $3 \times 10^8$ | 62 | 0.96 |
| 33-21 | 91.8 | — | 65 | 55 | $8 \times 10^8$ | O | $1 \times 10^8$ | 61 | 0.58 |
| 33-22 | 93.1 | 0.2 | 75 | 158 | $2 \times 10^9$ | O | $2 \times 10^9$ | 157 | 0.01 |
| 33-23 | 91.8 | — | 70 | 64 | $7 \times 10^6$ | O | $7 \times 10^6$ | 63 | 0.93 |
| 33-24 | 92.7 | — | 70 | 46 | $9 \times 10^5$ | O | $1 \times 10^6$ | 47 | 1.15 |
| 33-25 | 91.8 | 0.8 | 65 | 135 | $1 \times 10^5$ | O | $3 \times 10^5$ | 140 | 0.04 |
| 33-26 | 90.1 | — | 60 | 51 | $7 \times 10^8$ | O | $3 \times 10^9$ | 59 | 0.72 |
| 33-27 | 90.3 | — | 65 | 63 | $2 \times 10^7$ | O | $5 \times 10^7$ | 68 | 0.95 |
| 33-28 | 90.1 | 0.5 | 70 | 158 | $2 \times 10^6$ | O | $4 \times 10^6$ | 153 | 0.02 |
| 33-29 | 91.1 | 0.9 | 70 | 161 | $8 \times 10^5$ | O | $1 \times 10^5$ | 156 | 0.02 |
| 33-30 | 92.3 | — | 55 | 35 | $7 \times 10^7$ | O | $2 \times 10^8$ | 44 | 1.33 |
| 33-31 | 93.9 | — | 70 | 49 | $6 \times 10^9$ | O | $6 \times 10^9$ | 49 | 1.23 |
| 33-32 | 91.5 | — | 65 | 59 | $1 \times 10^9$ | O | $3 \times 10^9$ | 65 | 0.47 |

TABLE 8

| Example | Aqueous ammonia Rs Ω/□ | G % | NaCl solution Rs Ω/□ | G % | Boiling water Rs Ω/□ | G % | Acetic acid solution Rs Ω/□ | G % |
|---|---|---|---|---|---|---|---|---|
| 33-1 | $8 \times 10^8$ | 69 | $6 \times 10^8$ | 66 | $8 \times 10^8$ | 68 | $6 \times 10^8$ | 67 |
| 33-2 | $4 \times 10^7$ | 67 | $2 \times 10^7$ | 65 | $5 \times 10^7$ | 65 | $4 \times 10^7$ | 64 |
| 33-3 | $1 \times 10^6$ | 64 | $1 \times 10^6$ | 62 | $1 \times 10^6$ | 63 | $1 \times 10^6$ | 62 |
| 33-4 | $5 \times 10^8$ | 153 | $4 \times 10^8$ | 150 | $5 \times 10^8$ | 151 | $3 \times 10^8$ | 150 |
| 33-5 | $5 \times 10^8$ | 68 | $5 \times 10^8$ | 68 | $5 \times 10^8$ | 68 | $5 \times 10^8$ | 68 |
| 33-6 | $3 \times 10^6$ | 136 | $3 \times 10^6$ | 138 | $3 \times 10^6$ | 137 | $3 \times 10^6$ | 134 |
| 33-7 | $2 \times 10^8$ | 154 | $2 \times 10^8$ | 153 | $2 \times 10^8$ | 153 | $2 \times 10^8$ | 151 |
| 33-8 | $7 \times 10^6$ | 145 | $7 \times 10^6$ | 145 | $7 \times 10^6$ | 145 | $7 \times 10^6$ | 145 |
| 33-9 | $2 \times 10^7$ | 68 | $1 \times 10^7$ | 66 | $2 \times 10^7$ | 68 | $1 \times 10^7$ | 66 |
| 33-10 | $3 \times 10^8$ | 67 | $3 \times 10^8$ | 67 | $3 \times 10^8$ | 67 | $3 \times 10^8$ | 67 |
| 33-11 | $6 \times 10^4$ | 38 | $5 \times 10^4$ | 36 | $5 \times 10^6$ | 38 | $5 \times 10^4$ | 39 |
| 33-12 | $8 \times 10^6$ | 67 | $7 \times 10^6$ | 66 | $8 \times 10^6$ | 67 | $7 \times 10^6$ | 66 |
| 33-13 | $5 \times 10^6$ | 54 | $5 \times 10^6$ | 54 | $5 \times 10^6$ | 54 | $5 \times 10^6$ | 54 |
| 33-14 | $1 \times 10^8$ | 156 | $9 \times 10^7$ | 155 | $9 \times 10^7$ | 154 | $9 \times 10^7$ | 153 |
| 33-15 | $2 \times 10^6$ | 135 | $1 \times 10^6$ | 135 | $2 \times 10^6$ | 136 | $1 \times 10^6$ | 134 |
| 33-16 | $6 \times 10^6$ | 62 | $6 \times 10^6$ | 62 | $6 \times 10^6$ | 62 | $6 \times 10^6$ | 62 |
| 33-17 | $8 \times 10^6$ | 55 | $8 \times 10^6$ | 53 | $8 \times 10^6$ | 54 | $8 \times 10^6$ | 53 |
| 33-18 | $2 \times 10^6$ | 55 | $2 \times 10^6$ | 55 | $2 \times 10^6$ | 55 | $2 \times 10^6$ | 55 |
| 33-19 | $8 \times 10^5$ | 160 | $8 \times 10^5$ | 158 | $8 \times 10^5$ | 156 | $8 \times 10^5$ | 158 |
| 33-20 | $4 \times 10^8$ | 68 | $3 \times 10^8$ | 66 | $3 \times 10^8$ | 66 | $3 \times 10^8$ | 65 |
| 33-21 | $9 \times 10^8$ | 53 | $8 \times 10^8$ | 54 | $1 \times 10^9$ | 52 | $8 \times 10^8$ | 55 |
| 33-22 | $2 \times 10^9$ | 158 | $2 \times 10^9$ | 158 | $2 \times 10^9$ | 158 | $2 \times 10^9$ | 158 |
| 33-23 | $7 \times 10^6$ | 64 | $7 \times 10^6$ | 64 | $7 \times 10^6$ | 64 | $7 \times 10^6$ | 64 |
| 33-24 | $9 \times 10^5$ | 46 | $9 \times 10^5$ | 46 | $9 \times 10^5$ | 46 | $9 \times 10^5$ | 46 |
| 33-25 | $2 \times 10^5$ | 137 | $2 \times 10^5$ | 138 | $2 \times 10^5$ | 139 | $3 \times 10^5$ | 139 |
| 33-26 | $7 \times 10^8$ | 53 | $7 \times 10^8$ | 52 | $8 \times 10^8$ | 53 | $8 \times 10^8$ | 51 |
| 33-27 | $4 \times 10^7$ | 67 | $4 \times 10^7$ | 66 | $4 \times 10^7$ | 66 | $3 \times 10^7$ | 65 |
| 33-28 | $3 \times 10^6$ | 160 | $2 \times 10^6$ | 159 | $3 \times 10^6$ | 161 | $2 \times 10^6$ | 158 |
| 33-29 | $9 \times 10^5$ | 162 | $8 \times 10^5$ | 161 | $8 \times 10^5$ | 161 | $8 \times 10^5$ | 161 |
| 33-30 | $1 \times 10^8$ | 41 | $9 \times 10^8$ | 39 | $1 \times 10^8$ | 40 | $9 \times 10^7$ | 38 |
| 33-31 | $6 \times 10^9$ | 49 | $6 \times 10^9$ | 49 | $6 \times 10^9$ | 49 | $6 \times 10^9$ | 49 |
| 33-32 | $3 \times 10^9$ | 56 | $2 \times 10^9$ | 57 | $2 \times 10^9$ | 55 | $1 \times 10^9$ | 59 |
| 33-1 | $5 \times 10^8$ | 65 | $5 \times 10^8$ | 65 | $5 \times 10^8$ | 65 | | |
| 33-2 | $1 \times 10^7$ | 63 | $1 \times 10^7$ | 63 | $1 \times 10^7$ | 63 | | |
| 33-3 | $1 \times 10^6$ | 62 | $1 \times 10^6$ | 62 | $1 \times 10^6$ | 62 | | |
| 33-4 | $2 \times 10^8$ | 148 | $2 \times 10^8$ | 148 | $2 \times 10^8$ | 148 | | |
| 33-5 | $5 \times 10^8$ | 68 | $5 \times 10^8$ | 68 | $5 \times 10^8$ | 68 | | |
| 33-6 | $3 \times 10^6$ | 130 | $3 \times 10^6$ | 130 | $3 \times 10^6$ | 130 | | |
| 33-7 | $1 \times 10^8$ | 151 | $1 \times 10^8$ | 151 | $1 \times 10^8$ | 151 | | |
| 33-8 | $7 \times 10^6$ | 145 | $7 \times 10^6$ | 145 | $7 \times 10^6$ | 145 | | |
| 33-9 | $1 \times 10^7$ | 65 | $1 \times 10^7$ | 65 | $1 \times 10^7$ | 65 | | |
| 33-10 | $3 \times 10^8$ | 67 | $3 \times 10^8$ | 67 | $3 \times 10^8$ | 67 | | |
| 33-11 | $5 \times 10^4$ | 35 | $5 \times 10^4$ | 35 | $5 \times 10^4$ | 35 | | |
| 33-12 | $7 \times 10^6$ | 66 | $7 \times 10^6$ | 66 | $7 \times 10^6$ | 66 | | |
| 33-13 | $5 \times 10^6$ | 54 | $5 \times 10^6$ | 54 | $5 \times 10^6$ | 54 | | |
| 33-14 | $9 \times 10^7$ | 153 | $9 \times 10^7$ | 153 | $9 \times 10^7$ | 153 | | |
| 33-15 | $1 \times 10^6$ | 132 | $1 \times 10^6$ | 132 | $1 \times 10^6$ | 132 | | |
| 33-16 | $6 \times 10^6$ | 62 | $6 \times 10^6$ | 62 | $6 \times 10^6$ | 62 | | |
| 33-17 | $8 \times 10^6$ | 53 | $8 \times 10^6$ | 53 | $8 \times 10^6$ | 53 | | |
| 33-18 | $2 \times 10^6$ | 55 | $2 \times 10^6$ | 55 | $2 \times 10^6$ | 55 | | |
| 33-19 | $8 \times 10^5$ | 158 | $8 \times 10^5$ | 158 | $8 \times 10^5$ | 158 | | |
| 33-20 | $3 \times 10^8$ | 65 | $3 \times 10^8$ | 65 | $3 \times 10^8$ | 65 | | |
| 33-21 | $8 \times 10^8$ | 54 | $8 \times 10^8$ | 55 | $8 \times 10^8$ | 55 | | |
| 33-22 | $2 \times 10^9$ | 158 | $2 \times 10^9$ | 158 | $2 \times 10^9$ | 158 | | |
| 33-23 | $7 \times 10^6$ | 64 | $7 \times 10^6$ | 64 | $7 \times 10^6$ | 64 | | |
| 33-24 | $9 \times 10^5$ | 46 | $9 \times 10^5$ | 46 | $9 \times 10^5$ | 46 | | |
| 33-25 | $1 \times 10^5$ | 135 | $1 \times 10^5$ | 135 | $1 \times 10^5$ | 135 | | |
| 33-26 | $7 \times 10^8$ | 52 | $8 \times 10^8$ | 51 | $8 \times 10^8$ | 51 | | |
| 33-27 | $2 \times 10^7$ | 63 | $2 \times 10^7$ | 63 | $2 \times 10^7$ | 63 | | |
| 33-28 | $2 \times 10^6$ | 158 | $2 \times 10^6$ | 158 | $2 \times 10^6$ | 158 | | |
| 33-29 | $8 \times 10^5$ | 161 | $8 \times 10^5$ | 161 | $8 \times 10^5$ | 161 | | |
| 33-30 | $7 \times 10^7$ | 35 | $7 \times 10^7$ | 35 | $7 \times 10^7$ | 35 | | |
| 33-31 | $6 \times 10^9$ | 49 | $6 \times 10^9$ | 49 | $6 \times 10^9$ | 49 | | |
| 33-32 | $2 \times 10^9$ | 58 | $1 \times 10^9$ | 59 | $1 \times 10^9$ | 59 | | |

EXAMPLES 34-1~34-31

Platen glasses having coatings thereon were prepared by coating soda glasses, 450×300×4 mm, for platen glasses with the coating solutions for forming transparent conductive ceramic coatings obtained in Examples 1–31 under the conditions as shown in Table 9. The platen glass thus prepared were evaluated item-by-item by the following procedures in addition to the aforementioned items (1) and (2).

(9) Paper-passing test:

The coated platen glass was incorporated into a copy machine equipped with ADF, and copying papers of A4 size were fed to ADF to count the number of papers passed therethrough before paper clogging takes place.

(10) Spot test:

The number of copying papers of A4 size fed to ADF of a copy machine operated at a gray scale before spot appeared on the duplicated copy. Further, light transmission (Tt) at 550 nm was measured at the time when spot appeared on the duplicated copy. The duplicated copy on which no spot appeared was measured for Tt after the paper passing test. (9).

For comparison, the platen glass before forming the coating thereon and ITO glass having formed thereon ITO film by the sputtering method were individually incorporated into a copy machine, and the same evaluation as above were conducted.

Results obtained are shown in Table 10.

TABLE 9

| Example | Coating Solution | Drying °C. | Drying Min. | Heating °C. | Heating Min. | UV irradiation | Protective solution | Drying °C. | Drying Min. | Heating °C. | Heating Min. | UV irradiation |
|---|---|---|---|---|---|---|---|---|---|---|---|---|
| 34-1 | 1 | 120 | 5 | 350 | 30 | — | — | — | — | — | — | — |
| 34-2 | 2 | 120 | 5 | 200 | 30 | (1) | — | — | — | — | — | — |
| 34-3 | 3 | 120 | 5 | — | — | — | G | 120 | 5 | 250 | 30 | — |
| 34-4 | 4 | 120 | 5 | — | — | — | G | 120 | 5 | 200 | 30 | (1) |
| 34-5 | 5 | 120 | 5 | 200 | 30 | — | G | 110 | 5 | 350 | 30 | — |
| 34-6 | 6 | 100 | 5 | — | — | — | G | 110 | 5 | 350 | 30 | — |
| 34-7 | 7 | 120 | 5 | 250 | 30 | (2) | — | — | — | — | — | — |
| 34-8 | 8 | 120 | 5 | — | — | — | G | 120 | 5 | 200 | 30 | (2) |
| 34-9 | 9 | 100 | 5 | 300 | 30 | — | G | 120 | 5 | 150 | 30 | — |
| 34-10 | 10 | 120 | 5 | 350 | 30 | (2) | G | 120 | 5 | 300 | 30 | (1) |
| 34-11 | 11 | 120 | 5 | 350 | 30 | — | G | 120 | 5 | 300 | 30 | (2) |
| 34-12 | 12 | 80 | 5 | 250 | 30 | — | — | — | — | — | — | — |
| 34-13 | 13 | 90 | 5 | 250 | 30 | — | G | 100 | 5 | 250 | 30 | — |
| 34-14 | 14 | 120 | 4 | 400 | 30 | — | — | — | — | — | — | — |
| 34-15 | 15 | 120 | 5 | — | — | — | G | 120 | 5 | 400 | 30 | — |
| 34-16 | 16 | 120 | 5 | 400 | 30 | (1) | — | — | — | — | — | — |
| 34-17 | 17 | 120 | 5 | — | — | (1) | G | 120 | 5 | 150 | 30 | (1) |
| 34-18 | 18 | 120 | 5 | — | — | (1) | G | 120 | 5 | 250 | 30 | (2) |
| 34-19 | 19 | 120 | 5 | — | — | — | G | 120 | 5 | 300 | 30 | — |
| 34-20 | 20 | 120 | 5 | 180 | 30 | — | — | — | — | — | — | — |
| 34-21 | 21 | 120 | 5 | 200 | 30 | — | G | 120 | 5 | 200 | 30 | — |
| 34-22 | 22 | 120 | 5 | 200 | 30 | — | G | 120 | 5 | 250 | 30 | (3) |
| 34-23 | 23 | 120 | 5 | — | — | — | G | 120 | 5 | 350 | 30 | — |
| 34-24 | 24 | 120 | 5 | 300 | 30 | (1) | — | — | — | — | — | — |
| 34-25 | 25 | 120 | 5 | — | — | (1) | G | 120 | 5 | 200 | 30 | (1) |
| 34-27 | 27 | 120 | 5 | 250 | 30 | — | G | 120 | 5 | 250 | 30 | — |
| 34-28 | 28 | 120 | 5 | 250 | 30 | — | — | — | — | — | — | — |
| 34-29 | 29 | 120 | 5 | — | — | — | G | 120 | 5 | 120 | 30 | (2) |
| 34-30 | 30 | 120 | 5 | 200 | 30 | (3) | G | 120 | 5 | 150 | 30 | — |
| 34-31 | 31 | 120 | 5 | 250 | 30 | — | G | 120 | 5 | 250 | 30 | (1) |

(1) After drying
(2) After heating
(3) During drying
Coating method: Roll coater
UV irradiation conditions: 210 mW/cm$^2$, irradiation for 3 minutes 2ith 2 kW high pressure mercury-vapor lamp

TABLE 10

| Example | Tt (%) | H (%) | Rs (Ω/□) | Paper-passing test (sheet) | Spot test Spot (sheet) | Spot test Tt (%) |
|---|---|---|---|---|---|---|
| 34-1 | 90.6 | 1.6 | 1 × 10$^9$ | >200000 | >200000 | 90.2 |
| 34-2 | 90.1 | 1.5 | 5 × 10$^8$ | >200000 | >200000 | 90.5 |
| 34-3 | 92.1 | 0.5 | 1 × 10$^7$ | >200000 | >200000 | 88.9 |
| 34-4 | 92.3 | 0.3 | 4 × 10$^8$ | >200000 | >200000 | 90.1 |
| 34-5 | 91.9 | 0.3 | 9 × 10$^8$ | >200000 | >200000 | 90.3 |
| 34-6 | 92.1 | 2.8 | 6 × 10$^6$ | >200000 | >200000 | 90.6 |
| 34-7 | 89.8 | 1.3 | 8 × 10$^8$ | >200000 | >200000 | 91.9 |
| 34-8 | 91.5 | 0.6 | 5 × 10$^6$ | >200000 | >200000 | 90.2 |
| 34-9 | 92.6 | 0.6 | 8 × 10$^8$ | >200000 | >200000 | 90.5 |
| 34-10 | 90.8 | 1.9 | 3 × 10$^8$ | >200000 | >200000 | 88.9 |
| 34-11 | 90.1 | 2.1 | 2 × 10$^4$ | >200000 | >200000 | 90.1 |
| 34-12 | 91.6 | 1.8 | 3 × 10$^7$ | >200000 | >200000 | 90.3 |
| 34-13 | 92.6 | 0.3 | 5 × 10$^8$ | >200000 | >200000 | 90.6 |
| 34-14 | 90.2 | 1.8 | 7 × 10$^7$ | >200000 | >200000 | 91.9 |
| 34-15 | 91.3 | 2.9 | 1 × 10$^8$ | >200000 | >200000 | 90.2 |
| 34-16 | 89.5 | 1.5 | 3 × 10$^8$ | >200000 | >200000 | 90.5 |
| 34-17 | 90.7 | 0.5 | 1 × 10$^8$ | >200000 | >200000 | 88.9 |
| 34-18 | 90.1 | 0.3 | 5 × 10$^8$ | >200000 | >200000 | 90.1 |
| 34-19 | 92.6 | 0.2 | 2 × 10$^5$ | >200000 | >200000 | 90.3 |
| 34-20 | 91.2 | 1.9 | 3 × 10$^9$ | >200000 | >200000 | 90.6 |
| 34-21 | 92.5 | 0.3 | 3 × 10$^9$ | >200000 | >200000 | 91.3 |
| 34-22 | 91.4 | 0.3 | 2 × 10$^9$ | >200000 | >200000 | 91.9 |
| 34-23 | 92.8 | 0.4 | 5 × 10$^6$ | >200000 | >200000 | 90.2 |
| 34-24 | 89.3 | 1.3 | 2 × 10$^8$ | >200000 | >200000 | 90.5 |
| 34-25 | 92.6 | 1.9 | 3 × 10$^4$ | >200000 | >200000 | 88.9 |
| 34-27 | 92.1 | 0.8 | 5 × 10$^7$ | >200000 | >200000 | 90.1 |
| 34-28 | 90.4 | 1.7 | 4 × 10$^6$ | >200000 | >200000 | 90.3 |
| 34-29 | 91.9 | 0.3 | 1 × 10$^6$ | >200000 | >200000 | 90.6 |
| 34-30 | 92.1 | 0.4 | 8 × 10$^8$ | >200000 | >200000 | 91.9 |
| 34-31 | 93.1 | 0.8 | 3 × 10$^9$ | >200000 | >200000 | 91.9 |
| Platen glass | 90.8 | 1.0 | 1 × 10$^{13}$ | 100 | >200000 | 90.8 |
| ITO glass | 91.0 | 0.52 | 2 × 10$^3$ | >200000 | 60000 | 85.5 |

What is claimed is:

1. A substrate coated with a transparent conductive ceramic coating, wherein said coating is formed from a coating solution which is a homogeneous solution or dispersion comprising:
   at least one compound selected from the group consisting of an acetylacetonate chelate compound and condensates thereof;
   an inorganic conductive compound;
   in a mixture of water and an organic solvent,
   where in the acetylacetonate compound is represented by the following formula:

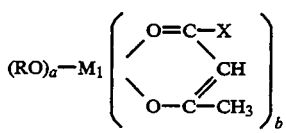

$$(RO)_a-M_1 \left( \begin{array}{c} O=C-X \\ \diagup \quad \diagdown \\ \quad \quad CH \\ \diagdown \quad \diagup \\ O-C=CH_3 \end{array} \right)_b \quad (I)$$

wherein a+b is 2–4, a is 0–3, b is 1–4, R is $C_nH_{2n+1}$— (n=3 or 4), X is $CH_3$—, $CH_3O$, $C_2H_5$—, or $C_2H_5O$—, and $M_1$ is an element selected from Groups IB, IIA, IIB, IIIA, IIIB, IVA, IVB, VA, VB, VIA, VIIA, or VIII or vanadyl (VO); and wherein said substrate has a surface resistance of $10^3$–$10^{11}$ $\Omega/\square$, a total light transmission of at least 85% and a haze of less than 10%.

2. The substrate coated with a transparent conductive ceramic coating as claimed in claim 1, wherein said coated substrate is a face-plate of a display device and has a resolving power of at least 50 bars/cm.

3. The substrate coated with a transparent conductive ceramic coating as claimed in claim 1, wherein a transparent protective coating is formed on said transparent conductive ceramic coating.

4. The substrate coated with a transparent conductive ceramic coating as claimed in claim 3, wherein said coated substrate is a face-plate of a display device and has a resolving power of at least 50 bars/cm.

5. The substrate coated with a transparent conductive ceramic coating as claimed in claim 1, wherein said coated substrate is a platen glass of a copy machine.

6. The substrate coated with a transparent conductive ceramic coating as claimed in claim 3, wherein said coated substrate is a platen glass of a copy machine.

7. The substrate coated with a transparent conductive ceramic coating as claimed in claim 3, wherein said transparent protective coating consists essentially of at least one of $SiO_2$ and $ZrO_2$.

8. A substrate coated with a transparent conductive ceramic coating, wherein said coating is formed from a coating solution which is a homogeneous solution or dispersion comprising:

at least one compound selected from the group consisting of an acetylacetonate chelate compound and condensates thereof;
an inorganic conductive compound;
in a mixture of water and an organic solvent,
wherein the acetylacetonate compound is represented by the following formula:

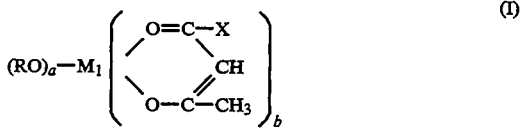

$$(RO)_a-M_1 \left( \begin{array}{c} O=C-X \\ \diagup \quad \diagdown \\ \quad \quad CH \\ \diagdown \quad \diagup \\ O-C=CH_3 \end{array} \right)_b \quad (I)$$

wherein a+b is 2–4, a is 0–3, b is 1–4, R is $C_nH_{2n+1}$— (n=3 or 4), X is $CH_3$—, $CH_3O$, $C_2H_5$—, or $C_2H_5O$—, and $M_1$ is an element selected from Groups IB, IIA, IIB, IIIA, IIIB, IVA, IVB, VA, VB, VIA, VIIA, or VIII or vanadyl (VO); and wherein said substrate has a surface resistance of $10^3$–$10^{11}\Omega/\square$ and a glossiness of 30–100%.

9. The substrate coated with a transparent conductive ceramic coating as claimed in claim 8, wherein said coated substrate is a face-plate of a display device and has a resolving power of at least 50 bars/cm.

10. The substrate coated with a transparent conductive ceramic coating as claimed in claim 8, wherein a transparent protective coating is formed on said transparent conductive ceramic coating.

11. The substrate coated with a transparent conductive ceramic coating as claimed in claim 10, wherein said coated substrate is a face-plate of a display device and has a resolving power of at least 50 bars/cm.

12. The substrate coated with a transparent conductive ceramic coating as claimed in claim 10, wherein said transparent protective coating consists essentially of at least one of $SiO_2$ and $ZrO_2$.

* * * * *

UNITED STATES PATENT AND TRADEMARK OFFICE
CERTIFICATE OF CORRECTION

PATENT NO. : 5,424,008
DATED : June 13, 1995
INVENTOR(S) : Toshiharu Hirai, Yoneji Abe and Michio Komatsu It is certified that error appears in the above-indentified patent and that said Letters Patent is hereby corrected as shown below:

Column 1 Line 33 after "relates" insert --to--.

Column 2 Line 17 "portion" should read --portions--.

Column 2 Line 64 after "patent" insert --directed to--.

Column 3 Line 32 "dialkoxy-bisacetyiacetonatozirconium)," should read --dialkoxy-bisacetylacetonatozirconium),--.

Column 4 Line 14 "dialkoxy-bisacetonato zirconium)," should read --dialkoxy-bisacetylacetonatozirconium),--.

Column 4 Line 52 after "solution" delete ",".

Column 6 Line 41 "machine" should read --machines--.

Column 6 Line 42 "transparent" should read --transparency--.

Column 6 Line 52 "substance" should read --substances--.

Column 7 Line 64 "in" should read --In--.

UNITED STATES PATENT AND TRADEMARK OFFICE
CERTIFICATE OF CORRECTION

PATENT NO. : 5,424,008
DATED : June 13, 1995
INVENTOR(S) : Toshiharu Hirai, Yoneji Abe and Michio Komatsu Page 2 of 5

It is certified that error appears in the above-indentified patent and that said Letters Patent is hereby corrected as shown below:

Column 9 Line 26 "represents" should read --represent--.

Column 9 Line 65 "10 substrate," should read --substrate,--.

Column 10 Line 40 "cover" should read --covers--.

Column 10 Line 40 "toughened" should read --roughened--.

Column 10 Lines 42-43 "substrates" should read --substrate--.

Column 10 Line 66 "times" should read --time--.

Column 12 Line 38 "+5%," should read --±5%,--.

Column 15 Line 12 "exceeds" should read --exceed--.

Column 15 Line 54 "ZABI" should read --ZAB1--.

Column 15 Line 58 "TAPI" should read --TAP1--.

Column 15 Line 67 "lees" should read --less--.

Column 16 Line 29 after "($M_1O_x$)" insert --]--.

Column 16 Line 30 "ZABI" should read --ZAB1--.

Column 16 Line 39 "TAPI" should read --TAP1--.

UNITED STATES PATENT AND TRADEMARK OFFICE
CERTIFICATE OF CORRECTION

PATENT NO. : 5,424,008　　　　　　　　　　　　　　Page 3 of 5
DATED : June 13, 1995
INVENTOR(S) : Toshiharu Hirai, Yoneji Abe and Michio Komatsu It is certified that error appears in the above-indentified patent and that said Letters Patent is hereby corrected as shown below:

Column 17, last line of TABLE 3, "Examlpe 21" should read --Example 21--.

Column 17, in 'Note 1)', first line of text after TABLE 3, "E in liquids." should read --E liquids.--.

Column 18, TABLE 4, third heading, "$M_2O_x$" should read -- $\dfrac{M_2O_x}{g}$ --.

Column 18, TABLE 4, last heading "Organic solvent" should read -- $\dfrac{\text{Organic solvent}}{g}$ --.

Column 19 Line 6 "TAPI," should read --TAP1,--.

Column 19, TABLE 5, third heading, "$\dfrac{M_2O_x}{g}$" should read -- $\dfrac{M_2O_x}{g}$ --.

Column 19 Line 39 after "K.K.)" insert --.--.

Column 20 Line 34 "(Rs)" should read --(Rz)--.

UNITED STATES PATENT AND TRADEMARK OFFICE
CERTIFICATE OF CORRECTION

PATENT NO. : 5,424,008
DATED : June 13, 1995
INVENTOR(S) : Toshiharu Hirai, Yoneji Abe and Michio Komatsu Page 4 of 5

It is certified that error appears in the above-indentified patent and that said Letters Patent is hereby corrected as shown below:

Column 21, fourth line of text after TABLE 6, "Spiner," should read --Spinner,--.

Column 23, TABLE 8, second occurrence of 'Example 33-1' should begin a continuation of Table 8, with three (3) different headings, which should be inserted above each column as follows:

| Acetone | | EtOH | | n-PrOH | |
|---|---|---|---|---|---|
| Rs | G | Rs | G | Rs | G |
| Ω/□ | % | Ω/□ | % | Ω/□ | % |

Column 23 Line 68 "glass" should read --glasses--.

Column 25 Line 7 "test. (9)." should read --test (9).--.

Column 25 Lines 11-12 "evaluation" should read --evaluations--.

Column 25, TABLE 9, in Example 34-14, under heading 'Coating Solution, Drying Min.', "4" should read --5--.

Column 25, TABLE 9, in Example 34-14, under heading 'Protective solution, Drying Min.', insert -- — --.

Column 25, fifth line of text after TABLE 9, "2ith" should read --with--.

UNITED STATES PATENT AND TRADEMARK OFFICE
CERTIFICATE OF CORRECTION

PATENT NO. : 5,424,008
DATED : June 13, 1995
INVENTOR(S) : Toshiharu Hirai, Yoneji Abe and Michio Komatsu It is certified that error appears in the above-indentified patent and that said Letters Patent is hereby corrected as shown below:

Claim 1 Line 67 Column 26 "where in" should read --wherein--.

Claim 8 Line 23 Column 28 "$10^3$-$10^{11}\Omega/\square$" should read --$10^3$-$10^{11}$ $\Omega/\square$--.

Signed and Sealed this

Ninth Day of January, 1996

Attest:

BRUCE LEHMAN

*Attesting Officer*   *Commissioner of Patents and Trademarks*